United States Patent
Glogowski et al.

(10) Patent No.: US 6,637,701 B1
(45) Date of Patent: Oct. 28, 2003

(54) GIMBALED ION THRUSTER ARRANGEMENT FOR HIGH EFFICIENCY STATIONKEEPING

(75) Inventors: Michael Joseph Glogowski, Auzielle (FR); Neil Evan Goodzeit, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/114,472

(22) Filed: Apr. 3, 2002

(51) Int. Cl.$^7$ ................................................. B64G 1/26
(52) U.S. Cl. ........................................ 244/169; 244/164
(58) Field of Search ................................ 244/169, 172, 244/158 R, 164

(56) References Cited

U.S. PATENT DOCUMENTS

| | | | |
|---|---|---|---|
| 4,767,084 A | | 8/1988 | Chan et al. |
| 5,100,084 A | | 3/1992 | Rahn et al. |
| 5,284,309 A | * | 2/1994 | Salvatore et al. |
| 5,335,179 A | * | 8/1994 | Boka et al. |
| 5,349,532 A | | 9/1994 | Tilley et al. |
| 5,400,252 A | * | 3/1995 | Kazimi et al. |
| 5,433,402 A | * | 7/1995 | Surauer et al. |
| 5,458,300 A | * | 10/1995 | Flament et al. |
| 5,765,780 A | | 6/1998 | Barskey et al. |
| 5,813,633 A | * | 9/1998 | Anzel |
| 5,845,880 A | * | 12/1998 | Petrosov et al. |
| 5,984,236 A | | 11/1999 | Keitel et al. |
| 5,984,237 A | | 11/1999 | Goodzeit |
| 6,032,904 A | * | 3/2000 | Hosick et al. |
| 6,102,337 A | | 8/2000 | Quartararo |
| 6,116,543 A | * | 9/2000 | Koppel |
| 6,213,432 B1 | * | 4/2001 | Koppel |
| 6,260,805 B1 | | 7/2001 | Yocum, Jr. |
| 6,296,207 B1 | | 10/2001 | Tilley et al. |

FOREIGN PATENT DOCUMENTS

| | | | |
|---|---|---|---|
| EP | 0499815 | 8/1992 | |
| EP | 568209 | * 11/1993 | ................ 244/169 |
| EP | 0922635 | 11/1993 | |
| JP | 21597 | * 1/1991 | ................ 244/169 |

OTHER PUBLICATIONS

Voss, L, "New Thrust for U.S. Satellites," Aerospace America, American Institute of Aeronautics & Astronautics, New York, vol. 38, No. 2, Feb. 2000, pp. 36–40.

"Electric Propulsion," Aerospace America, American Institute of Aeronautics & Astronautics, New York, vol. 30, No. 12, Dec. 1, 1992, p. 42.

Anzel, B., "Stationkeeping the Hughes HS 702 Satellite with a Xenon Ion Propulsion System," Congress of the International Astronautical Federation, Sep. 28, 1998.

* cited by examiner

*Primary Examiner*—Tien Dinh
(74) *Attorney, Agent, or Firm*—Townsend and Townsend and Crew LLP

(57) ABSTRACT

An attitude control system for a spacecraft that includes a north side, a south side, an east side, a west side, an earth facing side, and an anti-earth facing side. The attitude control system includes a plurality of gimbaled thrusters interconnected with the spacecraft and arranged to produce thrust in a direction parallel to a roll-pitch plane of the spacecraft.

30 Claims, 6 Drawing Sheets

(a)

(b)

(a)

(b)

GIMBALED ION THRUSTER ARRANGEMENT FOR HIGH EFFICIENCY STATIONKEEPING

FIELD OF THE INVENTION

The present invention relates to a system and method for maneuvering a spacecraft. In particular, the present invention relates to a system and method that carries out spacecraft maneuvering with fuel savings as compared to known systems and methods. More particularly, the present invention relates to new thruster configurations.

BACKGROUND OF THE INVENTION

For a spacecraft to perform its mission generally requires control of its in-orbit position relative to the Earth. For example, the orbit of a geosynchronous communications spacecraft is controlled so that the spacecraft remains stationed above the equator at a fixed earth longitude within small tolerances in the north/south and east/west direction. This position control is necessary to allow access to the satellite using fixed-direction ground antennas and to prevent both signal and physical interference with nearby spacecraft.

The orbit control is accomplished by performing periodic orbital correction maneuvers, where thrusters are fired to change the spacecraft's velocity. During maneuvers, the attitude of the spacecraft is controlled so that it remains correctly pointed relative to the Earth and the momentum stored by actuators such as reaction or momentum wheels is adjusted. The fuel efficiency of the system is determined not only by the thruster technology used, but also by how the attitude and momentum control and the velocity change tasks are accomplished. Systems are desired that are as efficient as possible, thereby reducing the propellant required and allowing the payload mass of the spacecraft to be increased.

Various types of thrusters may be used to produce an orbital velocity change. For example, ion thrusters, such as Hall Current Thrusters or gridded ion engines, which accelerate Xenon ions through an electric field to high velocities utilizing electric power supplied by spacecraft solar arrays to generate thrust may be employed. One drawback of ion thrusters is that when the ions impinge on spacecraft surfaces they cause damage by removing surface material. In addition, the ion thruster exhaust components can interfere with communications signals transmitted to and from the spacecraft.

Another type of thruster that may be utilized includes Arcjet thrusters that heat hydrazine decomposition products using an electric arc. Generally, in designing a spacecraft, thruster technology is selected that provides the highest propellant efficiency and is compatible with the spacecraft design.

Whichever types of thrusters are utilized, they typically are mounted directly on a spacecraft or on a boom or other structure attached to a spacecraft to provide components of thrust in at least the east/west and north/south directions.

To minimize undesirable interactions between material emanating from thrusters, whether ions or other exhaust components, and elements of a geosynchronous communications spacecraft, the ion thrusters are typically located towards the panel that faces away from the Earth, commonly referred to as the base panel. FIGS. 1a and 1b illustrate such an arrangement. Along these lines, FIGS. 1a and 1b illustrate a satellite I that includes Hall Current Thrusters 3 and 5 arranged on gimbaled platforms. FIGS. 1a and 1b depicts the thrusters oriented in a position for stationkeeping and firing to produce 45° plume cones 7 and 9.

The thruster platforms shown in FIGS. 1a and 1b are arranged on the north and south sides of the spacecraft. This configuration is also referred to as an aft-mounted ion thruster arrangement. An advantage of this thruster arrangement is that the ions produced during thrusting may be expelled out the aft end of the spacecraft, away from sensitive surfaces and out of the path of RF signals.

Mounting ion thrusters on gimbaled platforms that permit control of the thruster vector orientations as shown in FIGS. 1a and 1b can increase fuel efficiency. The gimbaling eliminates the need to fire low-efficiency chemical thrusters such as hydrazine thrusters or bi-propellant thrusters for attitude control. Most satellites today utilize a variant of the aft-mounted arrangement shown in FIGS. 1a and 1b.

FIGS. 2a and 2b illustrate in greater detail an aft-mounted thruster configuration arrangement referenced to the body coordinates of a geosynchronous spacecraft 11. Along these lines, FIG. 2 illustrates a spacecraft 11 having a north side 13, a south side 15, an east side 17, a west side 19, an earth facing side 21, and an anti-earth facing side 23. Solar arrays 24 and 25 extend from the north side and the south side of the spacecraft. Four thrusters 27, 29, 31, and 33 are arranged in two pairs located at the corners of the spacecraft where the anti-earth side meets the north side and the south side.

Although the thruster configuration illustrated in FIGS. 1, 2a, and 2b is prevalent in satellites today, drawbacks are associated with the arrangement, as described below in greater detail. For an earth-pointing spacecraft, the yaw axis (x) is aligned with the Zenith vector, the vector directed from the center of the Earth towards the spacecraft; the roll axis (y) is aligned with the spacecraft velocity vector, which is directed in the east direction; and the pitch axis (z) is aligned with the orbit normal, which is directed in the north direction. The angle $\alpha$ is the angle of the thrust vector projection in the yaw/roll plane, which is measured from the yaw axis. On the other hand, the angle $\beta$ is the angle of the thrust vector from the pitch (z) axis. Typically, $\alpha$ is about 5 degrees to about 20 degrees and $\beta$ is approximately 45 degrees as constrained by the location of the center of mass of the spacecraft, because firing a single thruster must produce near-zero torque.

The most fuel efficient and operationally simple thruster arrangement for stationkeeping would allow thrust to be applied purely in the north/south direction (along the pitch axis) and in the east/west direction (along the roll axis). Thrust would not be applied in the radial (x) direction, since thrust in this direction is of limited utility for orbit control. The north/south thrusting provides inclination vector control, and the east/west thrusting provides longitude and eccentricity control.

The aft mounted configuration does not provide the desired thrust direction de-coupling, since a large thrust component is always generated in the unwanted radial direction (along the yaw axis) regardless of which thrusters are fired. For example, firing thrusters 27 and 29 for north/south stationkeeping (inclination control) produces a thrust vector equal to 2F [cos($\alpha$)sin($\beta$), 0, cos($\beta$)], where F is the nominal thruster force. Clearly, for $\beta$=45 degrees and $\alpha$=10 degrees the x and z thrust components are nearly equal. Hence, the radial coupling for a north/south maneuver using an aft mounted configuration is approximately 100%. Although this large radial coupling does not significantly affect the fuel required to perform inclination vector control, it does introduce operational complexity since split maneuvers must be executed 12 hours apart to cancel the effects of the radial thrust.

A more serious drawback of the aft-mounted configuration is that it increases the propellant required for east/west stationkeeping. For example, when thrusters 27 and 31 are fired for east/west stationkeeping the resulting thrust is 2F $[\cos(\alpha)\sin(\beta), \sin(\alpha)\sin(\beta), 0]$. For $\beta=45$ degrees and $\alpha=10$ degrees, the thrust vector is 2F $[0.69, 0.12, 0.0]$. Because longitude control can only be accomplished using the roll (y) thrust component, the fuel efficiency is reduced by a factor of 8 ($=1/0.12$) compared to systems that thrust directly along the roll axis (in the east/west direction). In addition, although the large radial (x) component can be used for eccentricity control, the fuel-efficiency is half that possible using thrusters that directly provide roll axis thrust. Hence, the eccentricity control fuel efficiency is reduced by roughly a factor of three ($=1\sqrt{(0.69/2)^2+0.12^2}$) as compared to thruster systems that can apply thrust directly along the roll axis.

SUMMARY OF THE INVENTION

Among advantages of the present invention are that it can address the above-described imitations as well as other limitations of known attitude control systems.

The present invention provides an attitude control system for a spacecraft that includes a north side, a south side, an east side, a west side, an earth facing side, and an anti-earth facing side. The attitude control system includes a plurality of gimbaled thrusters interconnected with the spacecraft. The thrusters are arranged to produce thrust in a direction parallel to a roll-pitch plane of the spacecraft.

Additionally, the present invention provides a method for maneuvering a spacecraft that includes a north side, a south side, an east side, a west side, an earth facing side, and an anti-earth facing side. The method includes gimbaling at least one of a plurality of thrusters interconnected with the spacecraft and operating the at least one thruster to produce thrust in a direction parallel to a roll-pitch plane of the spacecraft.

Still other objects and advantages of the present invention will become readily apparent by those skilled in the art from a review of the following detailed description. The detailed description shows and describes preferred embodiments of the invention, simply by way of illustration of the best mode contemplated of carrying out the present invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

Figure 1A:
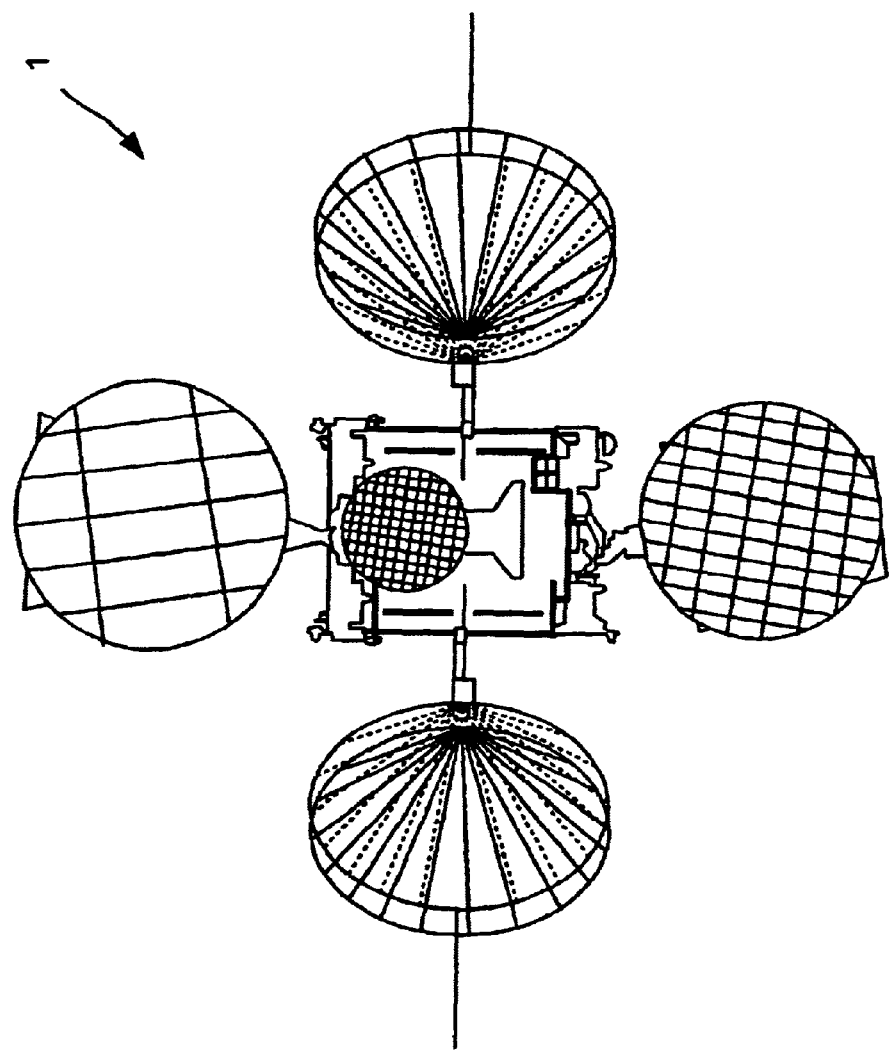
FIGS. 1a and I1b represent two different side views of an embodiment of a known spacecraft.
Figure 1B:
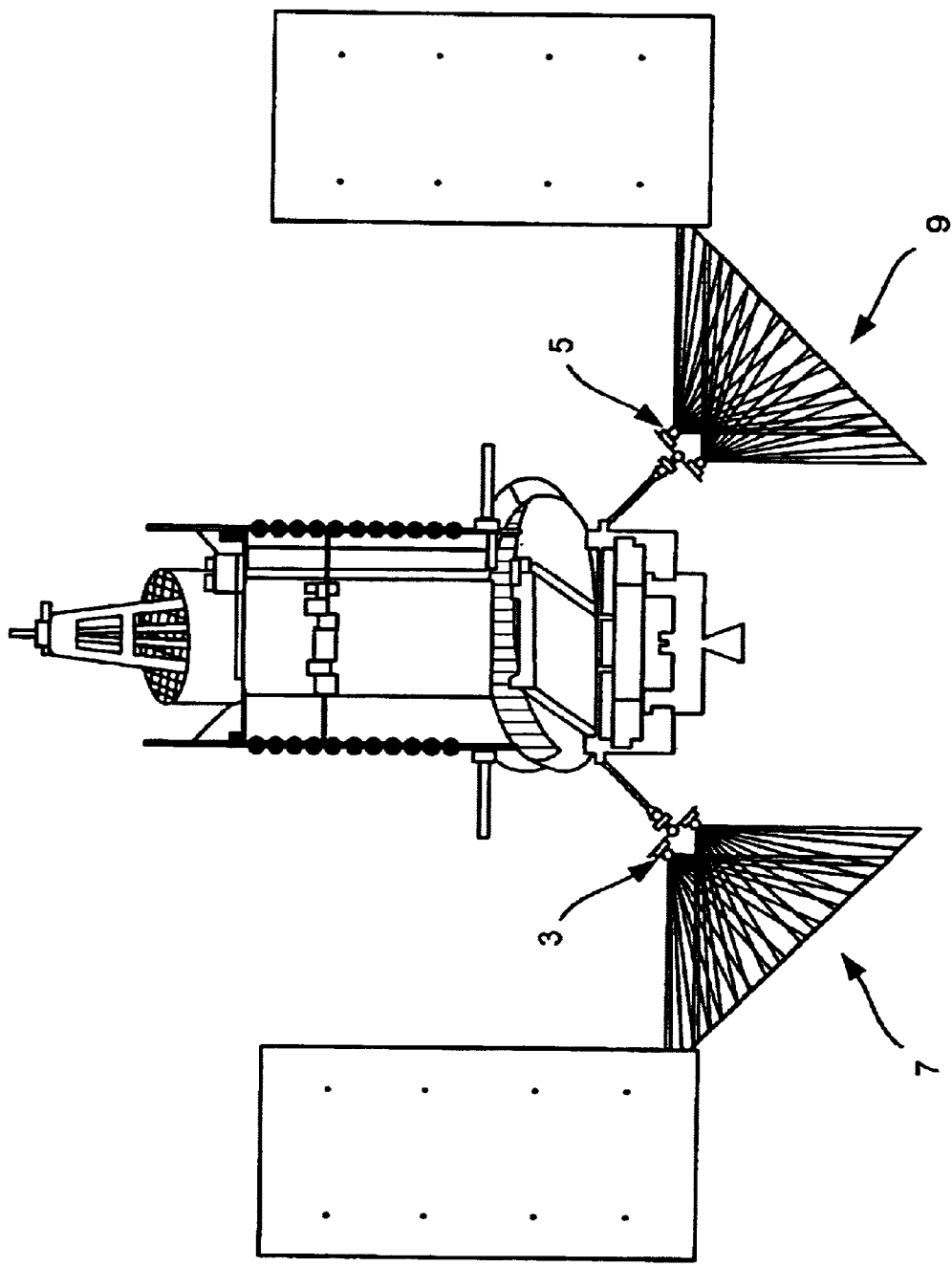
Figure 2:
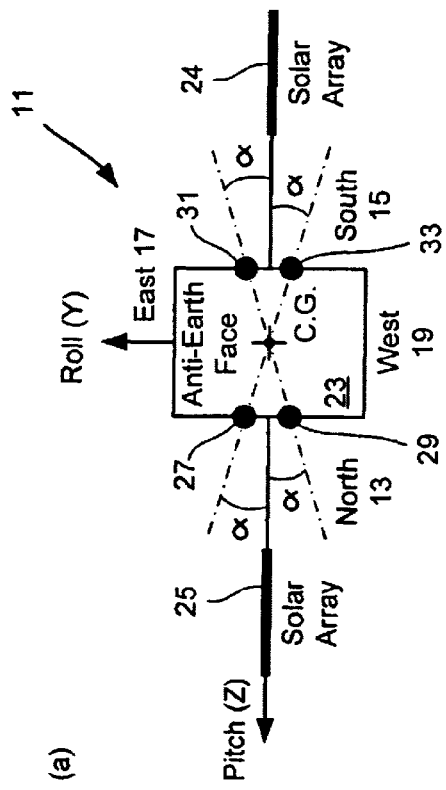
FIGS. 2a and 2b represent two different side views of an embodiment of a known spacecraft.
Figure 2:
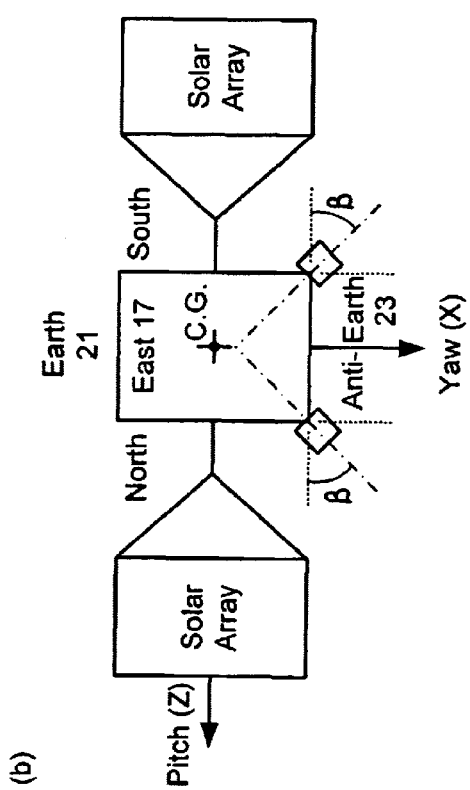

The present invention presents an alternative gimbaled ion thruster configuration that addresses the limitations of the aft-mounted configuration to provide improved fuel efficiency and simplified maneuver operations. In general, the present invention provides an attitude control system that includes a plurality of gimbaled thrusters interconnected with a spacecraft and arranged to produce thrust in a direction parallel to a roll-pitch plane of the spacecraft. Such a configuration is in contrast to the typical known configuration shown in FIGS. 1, 2a, and 2b, which produces thrust predominantly in a direction parallel to the yaw-pitch plane of a spacecraft.

It is not necessary that all the thrust be precisely in the roll-pitch plane, as constraints on thruster placement, position and alignment tolerances, and other error sources including plume impingement on spacecraft surfaces will result in an unavoidable radial thrust component. The thrusters are arranged, however, so that the radial thrust component has only a small effect on the orbit during orbit control maneuvers.

According to the present invention, thrusters may be arranged such that their thrust vectors lie in the roll-pitch plane, or are approximately parallel to the roll-pitch plane with only a small out-of-plane (radial) thrust component. To achieve this thrust vector geometry, the location of the center-of-mass may be taken into account in positioning the thrusters on a spacecraft. According to one embodiment, the thrusters are arranged symmetrically with respect to the center of mass. Typically, the thrusters may be located anywhere on the east, west, north, and/or south sides of a spacecraft. Regardless of where they are located the thrusters are capable of producing thrust predominantly parallel to the spacecraft roll-pitch plane.

Also, according to the invention, the thrusters are located on gimbaled platforms, such that they can be rotated to vary their thrust vector directions in the spacecraft body frame. The gimbaling arrangement allows pairs of thrusters to be fired with their thrust vectors oriented to provide thrust predominantly along the spacecraft roll axis. Thrust along the roll axis is used to provide an in-track velocity change (in the direction of the velocity vector) for controlling the spacecraft longitude and orbit eccentricity vector. The gimbaling allows the in-track velocity control task to be accomplished without changing the direction of the velocity vector. Furthermore, the thrusters may be oriented using the gimbals so that when pairs of thrusters are fired the thrust is predominantly along the spacecraft pitch axis. Thrust along the pitch axis is used to provide a cross-track velocity change (in the direction parallel to the orbit normal) for controlling the orbit inclination vector. The gimbaling allows the cross-track velocity control task to be accomplished without material changes in the in-track velocity.

Regarding the present invention, attitude control may be accomplished by commanding changes in the orientations of the gimbaled platforms to vary the total three-axis torque applied to the spacecraft. The torque changes may be made in response to attitude and rate errors sensed by the spacecraft attitude sensors and angular rate sensors such as gyros. Such attitude sensors may include earth sensors, sun sensors, and star trackers. In addition to control torque applied by the thrusters, additional control torque may be applied by actuators such as reaction wheels. In fact, the control action may be partitioned so that the reaction wheels effectively perform the control task at higher frequencies, while the thrusters may provide control at lower frequencies to minimize the movements of the gimbaled platforms. The torque applied by the gimbaled thrusters may be determined to cause the reaction wheel momentum to be adjusted toward a selected target value while the maneuver is in progress.

Typically, the thrusters are interconnected with the east and west and/or north and south sides of a spacecraft, but may be interconnected with other sides of a spacecraft. The thrusters may be mounted directly on a spacecraft. Alternatively, the thrusters may be mounted on booms attached to the spacecraft. The booms typically are deployable. Any ion thruster may be among the types of thrusters that may be utilized according to the present invention. For example, Hall Current Thrusters, Arcjet thrusters, or any other thruster may be utilized.

FIGS. 3a and 3b illustrate an embodiment of a spacecraft 35 including an embodiment of an attitude control system according to the present invention. Spacecraft 35 has a north side 37, a south side 39, an east side 41, a west side 43, an earth facing side 45, and an anti-earth facing side 47. Solar arrays 51 and 53 extend from the north side and the south side. Four thrusters 55, 57, 59, and 61 are arranged one at each of the corners of the spacecraft where the north side, the south side, the east side, and the west side meet. The thrusters are located in the roll-pitch plane and are arranged symmetrically with respect to the center of mass of the spacecraft. The nominal center of mass of a spacecraft lies in the spacecraft roll-pitch plane.

Figure 3:
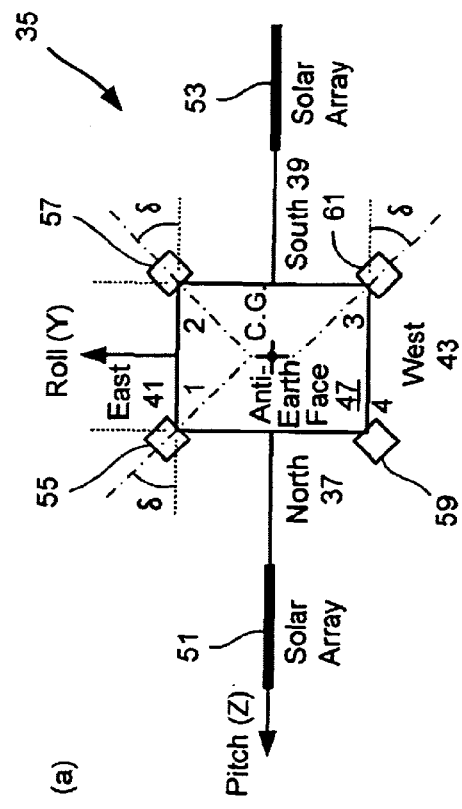
FIGS. 3a and 3b represent two different side views of an embodiment of a spacecraft according to the present invention.
Figure 3:
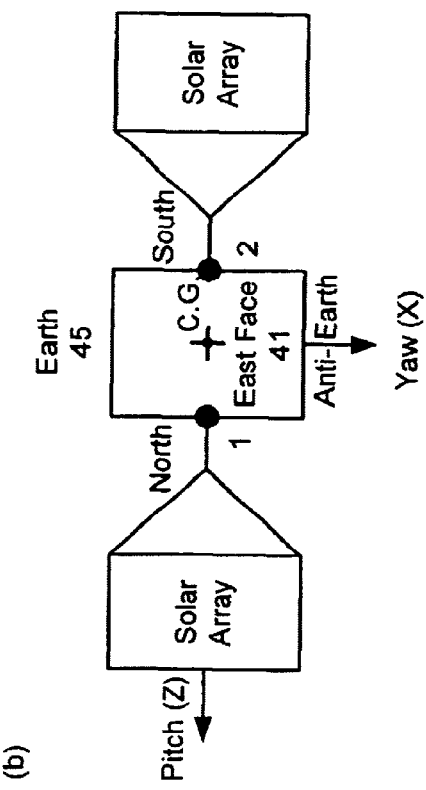
Figure 5:
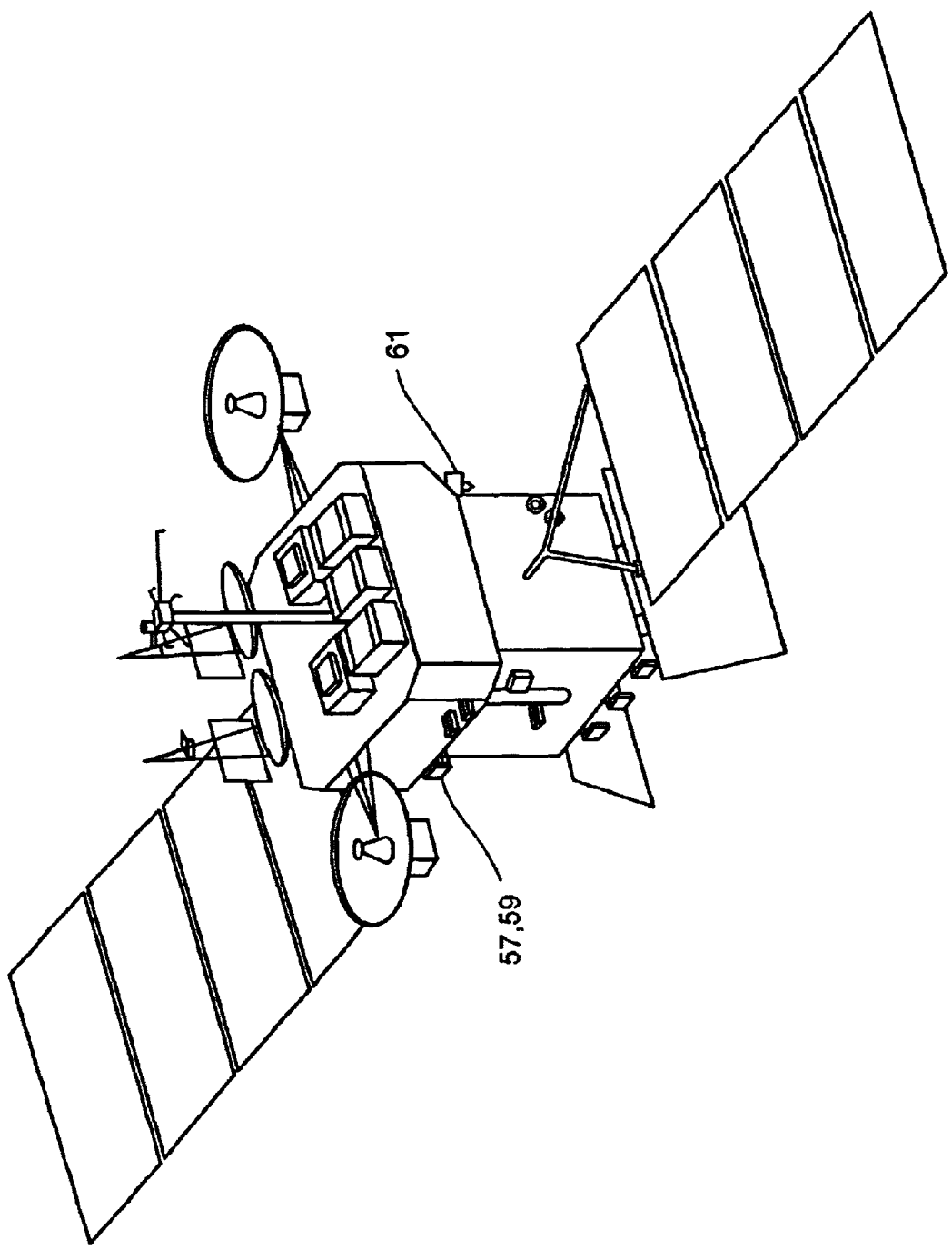
FIG. 5 represents a perspective view of an embodiment of a spacecraft according to the present invention.

The improved gimbaled thruster mounting arrangement according to the invention, one embodiment of which is shown in FIG. 3, is referred to as a "body-mounted" configuration. FIG. 5 illustrates an embodiment of a spacecraft that includes this configuration. The spacecraft shown in FIG. 5 is an extremely high frequency (EHF) spacecraft. In contrast to the aft-mounted configuration, which positions the thruster close to the yaw/pitch plane, the body-mounted configuration typically positions the thrusters as close to the roll/pitch plane as possible. This minimizes the unwanted radial thrust component when any combination of thrusters is fired.

One advantage of the thruster configuration shown in FIGS. 3a and 3b is that it avoids a significant thrust in the radial direction along the yaw(x) axis. The lack of radial coupling, along with the flexibility to modify the thruster cant angles using the gimbals, provides maximum fuel efficiency with a minimum number of thrusters. Typically to obtain the flexibility afforded by four gimbaled thrusters in the locations shown in FIGS. 3a and 3b, a spacecraft that utilizes fixed thrusters would require at least 12 thrusters.

In the embodiment shown in FIGS. 3a and 3b, the four thrusters are positioned in the roll/pitch plane with their thrust vectors canted an angle $\delta$ from the spacecraft pitch axis. The angle $\delta$ is the angle of the projection of the thrust axis is the roll-pitch plane, as measured from the plus or minus pitch axis as shown in FIGS. 3a and 3b. This angle can be varied by commanding changes to the orientation of the gimbaled platform. Additionally, the angles of the platform can be varied to change the thrust component in the pitch-yaw plane. Therefore, each thruster's thrust axis lies in the roll/pitch plane, and nominally has no radial, or x-axis, component. The cant angle may be varied using the gimbals depending on the type of maneuver to be performed.

For north/south stationkeeping, either thrusters 55 and 59, or thrusters 57 and 61 in the embodiment shown in FIGS. 3a and 3b, may be fired to generate thrust in the north/south (z-axis) direction without any unwanted radial (x-axis) or east/west (y-axis) components. The angle $\delta$ in this case is selected to be small to produce as much force as possible along the z-axis to maximize fuel efficiency. The angle is made large enough to maintain solar array plume exposure to within acceptable limits. It is important to note that the optimal angle may vary as a function of solar array angle to reflect changes in thruster/solar array geometry.

Because significant radial coupling is not present as with an aft mounted thruster configuration, the north/south maneuvers do not have to split into two maneuvers executed 12 hours apart, which simplifies operations. For east/west stationkeeping, either thrusters 55 and 57, or 59 and 61 may be fired, depending on the desired direction of the velocity change, east or west. In this case the thrusters are rotated so that $\delta$ is as close to 90 degrees as possible, so that each thruster's thrust vector is closely aligned with the roll axis (for $\delta=90$ degrees the thrust is along the roll axis) to maximize fuel efficiency.

For east/west stationkeeping with the thrusters rotated so their thrust axes are parallel to the roll axis ($\delta=90$ degrees), the longitude control fuel efficiency is roughly 8 times larger than for a typical aft mounted thruster configuration. In addition, eccentricity vector control is also more efficient by approximately a factor of three, due to the ability to apply thrust almost entirely along the roll axis.

Figure 4:
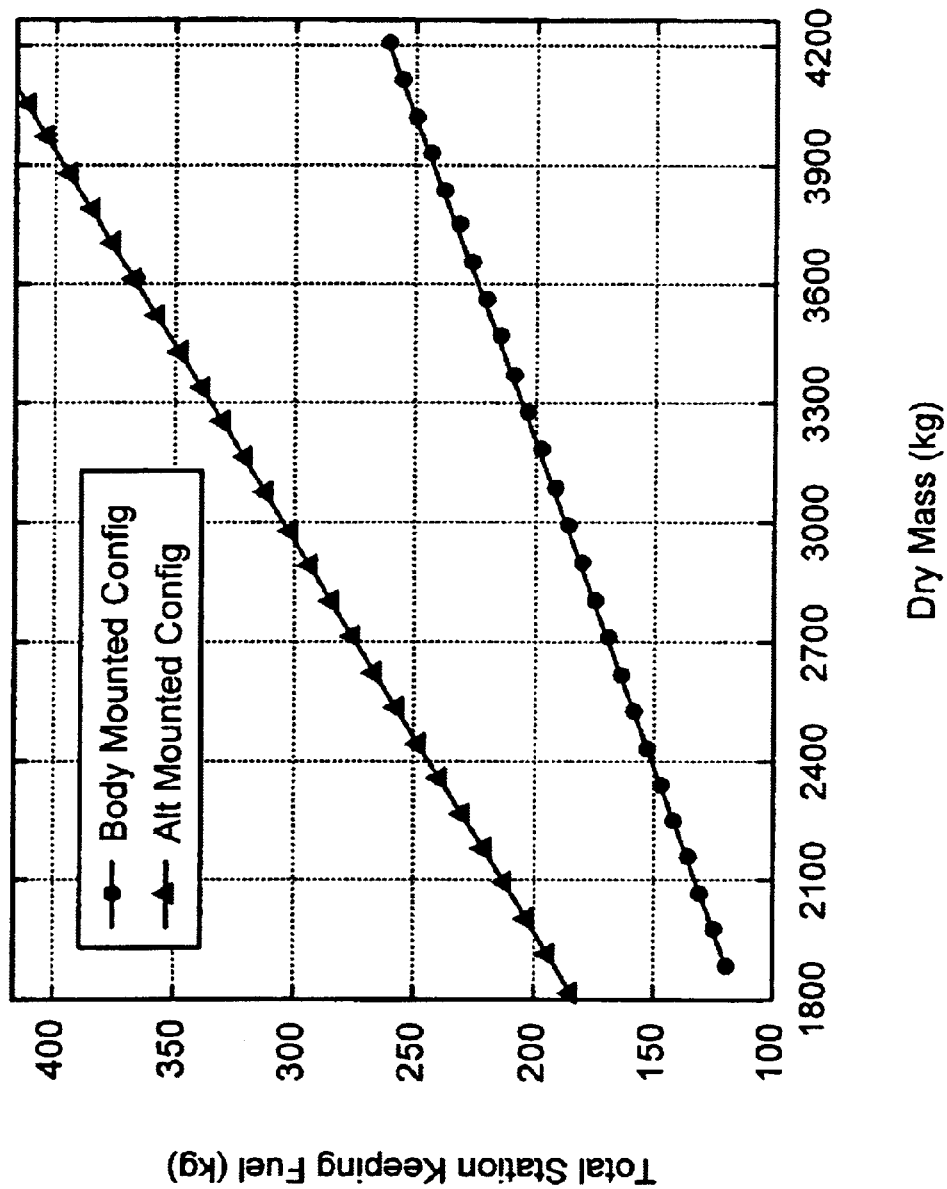
FIG. 4 represents a graph that illustrates relationships between total stationkeeping fuel and dry mass for an embodiment of a spacecraft according to the present invention and a known spacecraft.

The efficiency improvements capable according to the present invention can reduce propellant mass required for stationkeeping. FIG. 4 represents a graph that illustrates total fuel required for stationkeeping as a function of spacecraft dry mass for geosynchronous spacecraft that have a body mounted thruster configuration and an aft mounted thruster configuration during a 15 year mission. In particular, the graph shows the fuel advantage that can be obtained using a body-mounted thruster configuration according to the invention as a function of the spacecraft dry mass. The minimum mass advantage can be about 70 kg for a spacecraft having a dry mass of about 1800 kg and increases in proportion to the spacecraft mass. The fuel mass savings can be applied to additional payload mass to increase the spacecraft utility.

Although the body-mounted configuration provides improved fuel performance and operational simplicity, its applicability depends on the payload configuration. For spacecraft with east and west deployed reflectors, the plume effects of ion thruster firing may or may not be acceptable. For payloads that are mounted so that there is significant plume exposure on the earth-facing reflector surfaces, an aft mounted thruster configuration may be a better choice.

However, if the reflectors can be mounted forward towards the earth face, so that the plume exposure is on the back of the reflectors, implementation of a body-mounted arrangement may be possible. Furthermore, the body-mounted thruster configuration is particularly favorable for spacecraft that include phased array antennas. This is because phased array antennas can be mounted directly on or deployed from the earth face. An example of such a payload arrangement is the spacecraft shown in FIG. 5.

Figure 6:
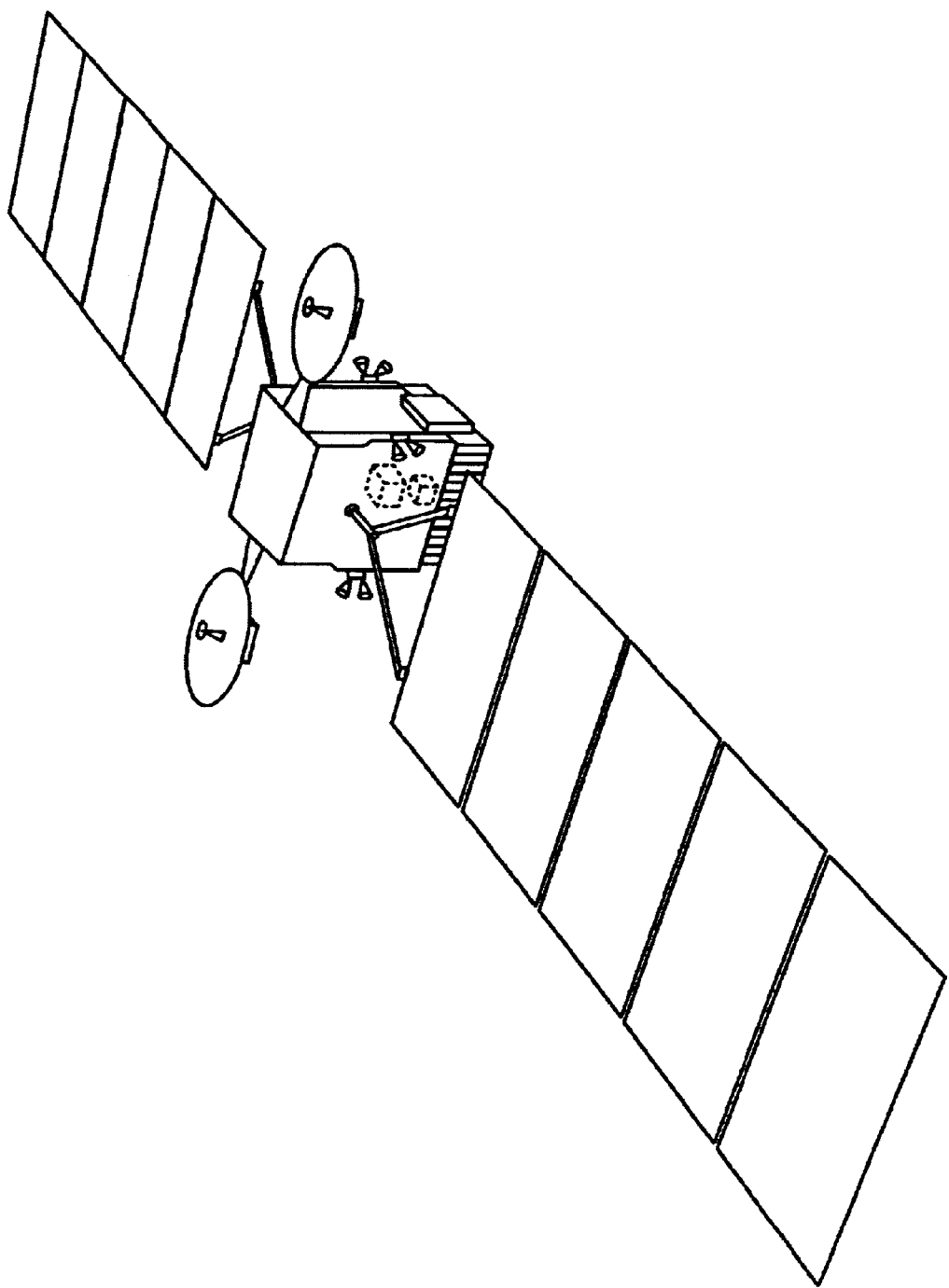
FIG. 6 represents another embodiment of a spacecraft according to the present invention.

The following discusses two representative embodiments of the present invention. The first embodiment shown in FIG. 6 includes six Hall Current Thrusters (HCTs). Two HCTs are mounted on a gimbaled platform at the corner of the south and east spacecraft faces (south/east platform), and two HCTs are mounted on a gimbaled platform at the corner of the south and west spacecraft faces (south/west) platform. The platforms are positioned so that they approximately lie in the spacecraft roll-pitch plane, with the spacecraft center-of-mass also located in this plane.

A third gimbaled platform supports two HCTs and is mounted at the corner of the east face and the north face (north/east platform). The third platform is also located in the spacecraft roll-pitch plane. Note that it would also be possible to locate the third platform at the corner of the west face and the north face (north/west platform). Where the third platform is located, depends on the spacecraft's in orbit longitude, which in turn determines the dominant direction for in-track Delta-V (east or west).

Each platform supports two HCTs to provide redundancy in the event that an HCT fails. If failures were not considered, the geosynchronous orbit control task could be accomplished with only one HCT on each platform, or with a total of three HCTs. However, also note that, the configuration with six HCTs allows four HCTs to be fired simultaneously with resultant thrust along the roll axis. This capability is useful during the transfer orbit (TO) phase of the mission, where the HCTs may be used to perform a partial orbit-raising as necessary to achieve the mission geosynchronous orbit. The higher thrust produced by firing four, as opposed to two HCTs, provides increased spacecraft mass-to-orbit for a given maximum orbit transfer time. During TO operations, the spacecraft attitude is controlled to align the spacecraft roll axis with a specified vector. Because the spacecraft attitude relative to an earth-fixed frame is not a primary concern, thrusters need only be fired on one side (east or west) of the spacecraft.

As described previously in connection with FIG. 3, the angle δ is the angle between the HCT thrust axis and the plus or minus pitch axis. This angle can be varied by rotating the gimbaled platform, which changes the angle of the HCT thrust vector in the roll-pitch plane. For North/South stationkeeping, a pair of HCTs on separate south face platforms are fired simultaneously, with δ selected to be as small as possible, so that each HCT's thrust vector is as close to the spacecraft pitch axis as possible to maximize fuel efficiency. The thrust generated is approximately along the orbit normal, and the maneuver is timed to provide the required change in the magnitude and direction of the inclination vector. For East/West stationkeeping, the HCT firing strategy depends on the direction in which the Delta-V is needed. For Delta-V in the west direction, a pair of HCTs, one on the south/east platform, and one of the north/east platform are fired simultaneously. The δ angles are selected to be as close to 90 degrees as possible. For Delta-V in the east direction, one of the two HCTs on the south/west platform is fired with the platform oriented so that the HCT thrust vector is directed through the spacecraft center-of-mass. Firing of the thruster produces a thrust component along both the roll axis and the pitch axis, hence the maneuver will have some impact on the inclination vector. An additional corrective North/South stationkeeping maneuver may therefore be required to further adjust the inclination vector. Note that for a configuration where the third platform is located at the corner of the west face and the north face, the same maneuver approach applies, but the East/West maneuver that produces North/South coupling will result in west direction Delta-V.

The second representative embodiment is shown in FIG. 3, and has been discussed previously.

The present invention also includes a method for maneuvering a spacecraft. In general, the method includes gimbaling at least one thruster and operating the thruster to produce thrust having a component parallel to a roll-pitch plane of a spacecraft. Prior to gimbaling and operating the thruster, a desired maneuver is determined, including any maneuver disclosed herein or any other maneuver. The gimbal angle(s) and thrust level(s) of necessary thruster(s) are determined to carry out the desired maneuver. The thrusters may be arranged and interconnected with the spacecraft to produce thrust in the directions as described herein. If the thrusters are mounted on booms, the booms may be deployed prior to operating the thrusters. With respect to controlling gimbaled thrusters, U.S. Pat. No. 6,481,672 entitled "Gimbaled Thruster Control System", discloses a system for utilizing gimbaled thrusters to control a spacecraft. U.S. Pat. No. 6,481,672 is assigned to the same assignee of the present case, and is incorporated by reference herein for all purposes.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. An attitude and orbit control system for a spacecraft that includes a north side, a south side, an east side, a west side, an earth facing side, and an anti-earth facing side, the attitude control system comprising:
    a plurality of gimbaled thrusters interconnected with the spacecraft, each thruster being positioned on the spacecraft such that by gimbaling each thruster can produce thrust in a direction substantially in a roll-pitch plane of the spacecraft while producing substantially no torque, wherein at least one of the plurality of gimbaled thrusters has a range of motion such that in a first position it directs thrust substantially alone a first axis, and in a second position it directs thrust substantially along a second axis, and wherein the second axis is perpendicular to the first axis.

2. The attitude and orbit control system according to claim 1, wherein the plurality of gimbaled thrusters comprise at least one pair of gimbaled thrusters on the east side and at least one pair of gimbaled thrusters on the west side.

3. The attitude and orbit control system according to claim 1, wherein the thrusters are arranged in the roll-pitch plane of the spacecraft.

4. The attitude and orbit control system according to claim 1, wherein the first axis comprises a roll axis of the spacecraft and the second axis comprises a pitch axis of the spacecraft.

5. The attitude and orbit control system according to claim 1, wherein the thrusters comprise Hall Current thrusters.

6. The attitude and orbit control system according to claim 1, wherein the thrusters comprise ion thrusters.

7. The attitude and orbit control system according to claim 1, wherein the thrusters comprise arcjet thrusters.

8. The attitude and orbit control system according to claim 1, wherein the thrusters perform at least one of north-south stationkeeping maneuvers, east-west stationkeeping maneuvers, changes in spacecraft velocity, and changes in reaction wheel assembly momentum.

9. The attitude and orbit control system according to claim 1, wherein the thrusters are symmetrically arranged with respect to a center of mass of the spacecraft.

10. The attitude and orbit control system according to claim 1, wherein the plurality of thrusters comprises four thrusters on the south side of the spacecraft and two thrusters on one of the east side and west side of the spacecraft.

11. The attitude and orbit control system according to claim 1, wherein the plurality of thrusters comprises two thrusters on the south side of the spacecraft and two thrusters on the north side of the spacecraft.

12. The attitude and orbit control system according to claim 1, wherein the thrusters are mounted directly on the spacecraft.

13. A method for maneuvering a spacecraft that includes a north side, a south side, an east side, a west side, an earth facing side, and an anti-earth facing side, the method comprising:
gimbaling at least one of a plurality of thrusters interconnected with the spacecraft;
operating the at least one thruster to produce thrust in a direction parallel to a roll-pitch plane of the spacecraft, wherein at least one thruster has a range of motion such that in a first position it directs thrust substantially along a first axis, and in a second position it directs thrust substantially along a second axis, and wherein the second axis is perpendicular to the first axis.

14. The method according to claim 13, wherein the first axis comprises a roll axis of the spacecraft.

15. The method according to claim 13, wherein the second axis comprises a pitch axis of the spacecraft.

16. The method according to claim 13, wherein the maneuvering comprises at least one of north-south stationkeeping maneuvers, east-west stationkeeping maneuvers, changes in spacecraft velocity, and changes in reaction wheel assembly momentum.

17. The method according to claim 13, wherein the thrust is produced in the roll-pitch plane of the spacecraft.

18. The method according to claim 13, further comprising:
symmetrically arranging the thrusters with respect to a center of mass of the spacecraft.

19. The method according to claim 13, further comprising: mounting the thrusters directly on the spacecraft.

20. The method according to claim 13, wherein the plurality of gimbaled thrusters comprise four thrusters, and wherein a thruster is arranged at a corner where the east side meets the north side, the east side meets the south side, the west side meets the north side and the west side meets the south side.

21. The method according to claim 13, wherein the plurality of gimbaled thrusters are arranged in the roll-pitch of the spacecraft.

22. The method according to claim 13, wherein the thrusters are interconnected with at least one of the north side, the south side, the east side, and the west side.

23. The method according to claim 13, wherein at least one of four thrusters on the south side and two thrusters on at least one of the east side of the spacecraft and the west side of the spacecraft is operated.

24. The method according to claim 13, wherein at least one of two thrusters on the south side and two thrusters on the north side of the spacecraft is operated.

25. The method according to claim 13, wherein gimbaling at least one of a plurality of thrusters interconnected with the spacecraft comprises gimbaling the thruster to the first position, and wherein operating the at least one thruster to produce thrust in a direction parallel to a roll-pitch plane of the spacecraft comprises performing an orbit transfer maneuver.

26. A spacecraft, comprising:
a north side, a south side, an east side, a west side, an earth facing side, and an anti-earth facing side; and
an attitude and orbit control system, comprising:
a plurality of gimbaled thrusters interconnected with the spacecraft, each thruster being positioned on the spacecraft such that by gimbaling each thruster can produce thrust in a direction substantially in a roll-pitch plane of the spacecraft while producing substantially no torque, wherein at least one of the plurality of gimbaled thrusters has a range of motion such that in a first position it directs thrust substantially along a first axis, and in a second position it directs thrust substantially along a second axis, and wherein the second axis is perpendicular to the first axis.

27. The spacecraft of claim 26, wherein the thrusters are arranged in the roll-pitch plane of the spacecraft.

28. The spacecraft of claim 26, wherein the first axis comprises a roll axis of the spacecraft and the second axis comprises a pitch axis of the spacecraft.

29. The spacecraft of claim 26, wherein the thrusters are symmetrically arranged with respect to a center of mass of the spacecraft.

30. The spacecraft of claim 26, wherein the plurality of thrusters comprises two thrusters on the south side of the spacecraft and two thrusters on the north side of the spacecraft.

* * * * *

UNITED STATES PATENT AND TRADEMARK OFFICE
CERTIFICATE OF CORRECTION

PATENT NO.   : 6,637,701 B1
DATED        : October 28, 2003
INVENTOR(S)  : Michael Joseph Glogowski and Neil Evan Goodzeit It is certified that error appears in the above-identified patent and that said Letters Patent is hereby corrected as shown below:

<u>Column 8,</u>
Line 49, replace "alone" with -- along --

<u>Column 10,</u>
Line 6, after "roll-pitch" add -- plane --

Signed and Sealed this

Twenty-third Day of December, 2003

JAMES E. ROGAN
*Director of the United States Patent and Trademark Office*